(No Model.)
E. E. RIES.
PROCESS OF WELDING TOGETHER SECTIONS OF PIPE BY ELECTRICITY.
No. 402,108. Patented Apr. 23, 1889.
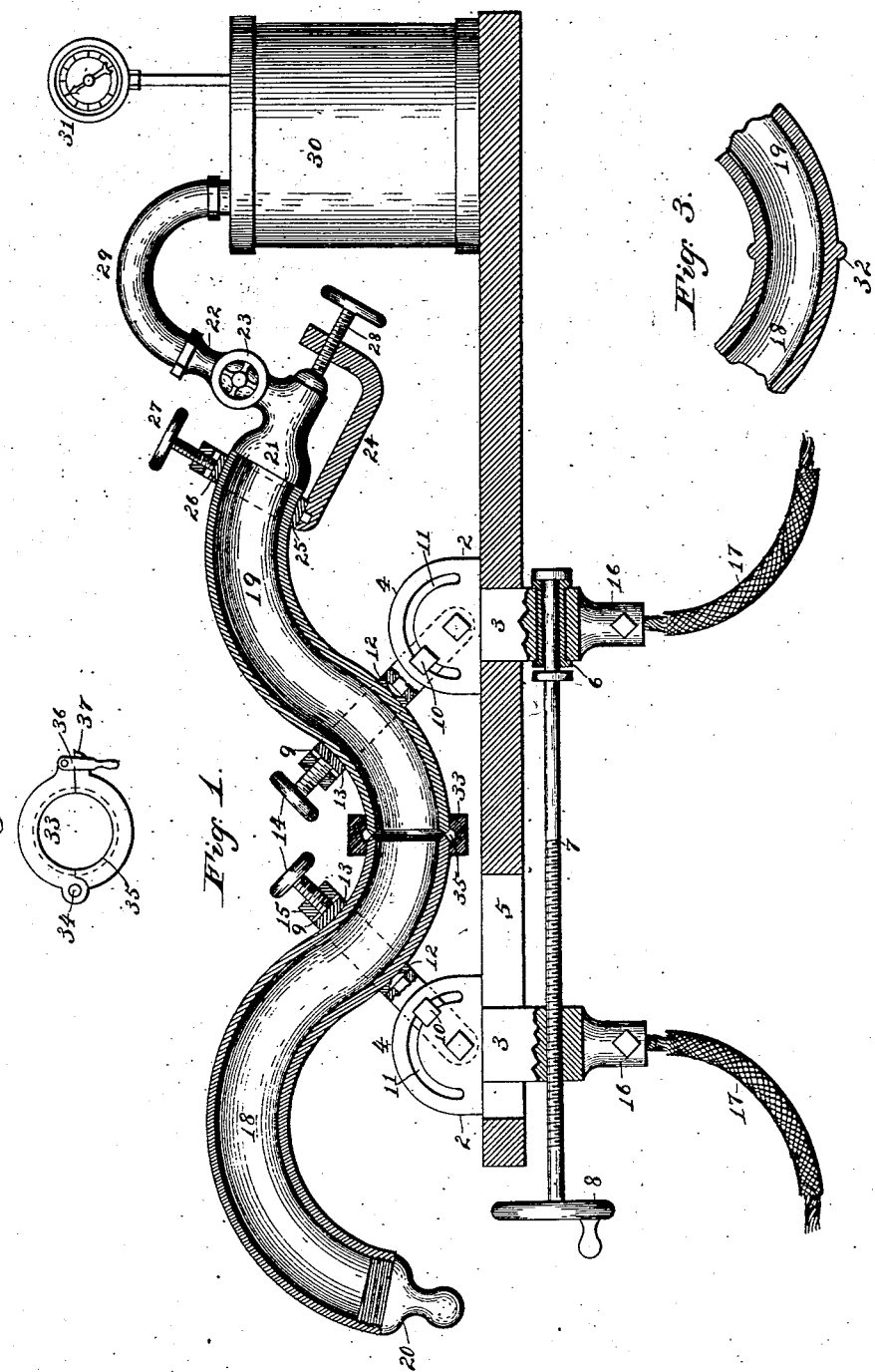
Witnesses:
Percy C. Bowen
James S. Smith
Inventor
Elias E. Ries
By Joseph Lyons
Attorney.

UNITED STATES PATENT OFFICE.

ELIAS E. RIES, OF BALTIMORE, MARYLAND, ASSIGNOR TO RIES & HENDERSON.

PROCESS OF WELDING TOGETHER SECTIONS OF PIPE BY ELECTRICITY.

SPECIFICATION forming part of Letters Patent No. 402,108, dated April 23, 1889.

Application filed February 12, 1889. Serial No. 299,573. (No model.)

*To all whom it may concern:*

Be it known that I, ELIAS E. RIES, a citizen of the United States, residing at Baltimore, in the State of Maryland, have invented certain new and useful Improvements in a Process of Welding Together Sections of Pipe, of which the following is a specification.

My invention has reference to improvements in the art of welding sections of pipes and other hollow articles together electrically, the object being to prevent the formation of ribs, burrs, or like projections in the interior of the pipe, so that said interior may remain smooth and unobstructed.
When the process of electric welding as heretofore practiced is used in welding together sections of pipe, the material upset at the weld expands in a great measure into the interior of the pipe, whereby the passage is obstructed and its capacity generally reduced. This I prevent, according to my process, by causing within the pipe during the formation of the weld a gas-pressure by which the material of the pipe rendered plastic at and about the weld is prevented from accumulating within the pipe, but is forced to accumulate on the outside of it, forming there a rib or bead, which is not only not objectionable, but which also adds to the strength of the weld.
In carrying my process into effect I so shape and manipulate the ends of the pipe-sections to be welded that an initial weld, hermetically closing the pipe at the juncture, is formed almost instantaneously and before the joined edges are upset to any considerable degree. I then produce the internal gas-pressure and then cause the upsetting of the joined edges for the completion of the weld, as will hereinafter more fully appear.
For practicing my method a great variety of apparatus may be employed, and in the accompanying drawings, which form a part of this specification, I have shown one apparatus which may be used to advantage; but it will be understood that I am not confined to the use of the instrumentalities herein shown.

I have illustrated in Figure 1 a complete pipe-welding apparatus with two sections of curved pipes in position to be welded together, the apparatus being shown mainly in longitudinal section; in Fig. 2, an end view of a molding-clamp used in my process; and in Fig. 3, a sectional view of two pieces of pipe welded together in accordance with my process.

Like numerals of reference indicate like parts all throughout the drawings.

Upon a bed-plate, 1, which may be made of wood or other insulating material, are mounted two castings, 2 2, a suitable distance apart. These castings are each composed of a tail-piece, 3, and an expanded head, 4, each tail-piece passing through the bed-plate and one of them being fixed to the same, while the other passes through a longitudinal slot, 5, formed in the bed-plate, and is movable in the line of said slot, so that it may be adjusted to any desired position within the same. In the tail-piece of the fixed casting 2 there is an insulating-bushing, 6, and in the same is journaled one end of a screw-rod, 7, which passes through a nut formed in the tail-piece of the movable casting. This screw-rod is turned by means of a hand-wheel, 8, and it will now be understood that I am thus enabled to adjust the movable casting to or from the fixed casting by turning the screw-rod in one direction or the other.

The heads of the castings are preferably made semicircular in form, and at a point corresponding to the center of the circle is pivoted a clamp, 9, which may be adjusted to any desired inclination and there fixed by a set-screw, 10, passing through a curved slot, 11, in the head and into the body of the clamp. Each clamp is formed with a ledge, 12, which constitutes one jaw of the clamp proper, and which serves as a seat for the pipe-sections to be welded together. Instead of forming this ledge 12 in one piece with the body of the clamp, it may be made removable and exchangeable, as indicated, so that variously-shaped ledges or lower jaws may be used in the same clamp. The upper jaw of the clamp is formed by a follower, 13, which is formed to adapt itself to the shape of the pipe, and which may also be exchangeable, like the lower jaw or ledge, 12.

A clamp-screw, 14, passing through the head 15 of the clamp bears upon the follower, and it will now be understood that by employing the construction so far described I am enabled to clamp two sections of pipes with the edges to be welded together facing each other, and by operating the screw-rod 7 I can adjust one of these sections to bear upon the other.

The lower ends of the tail-pieces are formed into binding-posts 16, and these binding-posts receive the leading-in wires 17, coming from a source of electric current capable of heating the articles held in the clamps to a welding heat. By preference I use in my process alternating currents of low tension and great quantity furnished by inductional transformers; but of course I am not limited to the use of such currents, since the low-tension currents furnished directly by a dynamo, a secondary battery, or any other source, may be used with advantage.

In the drawings I have shown two sections of pipes, 18 19, clamped in position for welding, and these pipes are here shown with bold curves or bends, not because my process is limited to the welding together of such pipe-sections, but because it is of special utility in connection with pipes of this character.

The free end of the pipe-section 18 is hermetically sealed by the screw-plug 20; but it may be sealed in any other way. To the free end of pipe 19 is applied a cap, 21, which in effect is what is technically known as an "elbow-joint" for pipes. One branch of it, 22, is provided with a valve manipulated by hand-wheel 23, as usual. This cap 21 is applied to the free end of pipe 19 by means of a clamp, 24, which consists of a U-shaped casting one branch of which is provided with a ledge, 25, and a follower, 26, and the end of the pipe is inserted between this ledge and follower and the latter is forced down upon the pipe by the clamp-screw 27. The other branch of the U-shaped clamp has a screw, 28, passing at right angles through the same and bearing upon the cap and forcing the same against the squared edge of the end of pipe 19, hermetically closing the latter.

To the branch 22 of the elbow-joint cap is connected a flexible tubing, 29, which in turn communicates with the receptacle 30, containing air or any other suitable gas under high pressure, which pressure is indicated by a pressure-gage, 31.

With an apparatus thus constructed my method is practiced in the following manner: The two sections of pipes or other hollow articles to be welded together I first place in the clamps 9, which latter will accommodate themselves to all shapes, and for the purposes of my process they are so adjusted that the edges of the pipes face each other; then by operating the screw-rod 7 these edges are brought into contact and the electric current is then allowed to pass. By preference, the ends of the pipes are chamfered both inside and outside down to a fine edge, as shown, so that the current in its passage from one clamp 9 to the other through pipes experiences the greatest resistance at these chamfered edges, which are almost instantly brought to a welding heat, and before the thicker portions of the chamfer or the next adjoining portions of the unchamfered parts have attained that heat. Thus immediately after the closing of the circuit an initial weld will be formed, which will effectively close the pipe around the line of juncture. Before doing all this the free end of pipe 18 must be plugged, as shown, and the free end of pipe-section 19 must be closed by cap 21 and the latter connected with the source 30 of gas-pressure, as hereinbefore described. The initial weld produced immediately after the closing of the circuit hermetically seals the pipe, and the weld is completed in the next succeeding moments by the heating to the welding temperature of the portions of the pipe immediately adjoining the chamfers, which portions are made to bear upon each other by operating the screw-rod 7. Simultaneously therewith, however, the valve controlling the communication between the source of gas-pressure and the pipes under operation is opened, and the gas-pressure thus produced within the pipes bearing upon the plastic welding portions at the line of juncture will force the material which is there being upset by the action of screw-rod 7 outwardly, and will thus prevent the formation of a burr or projection, which would reduce the capacity of the pipe. The material thus forced outwardly will form a bead or burr, 32, on the outer surface of the joined pipes, which is not only harmless, but which even tends to strengthen the weld, so that the formation of said bead on the outside should not be prevented, but, on the contrary, should be promoted. I do this by the use of the mold-clamp 33, which consists of two semi-circular jaws hinged together at 34, and each provided on its inner face with a groove, 35. (Indicated in dotted lines in Fig. 2.) This clamp is applied to the ends of the pipes to be joined in such position that the groove 35 surrounds the line of juncture of the two pipes, and the two jaws are clamped together by a latch, 36, pivoted to one jaw and passing over a nose, 37, formed on the other jaw. This whole mold-clamp must be made of or faced with some refractory insulating material—such as slate, marble, clay, mica, or earthenware.

It will now be seen that as the two sections of pipe are welded together under the internal gas-pressure the upset material will accumulate on the exterior of the pipe within the groove 35 of the mold-clamp, eventually filling said groove, and thus forming a well-defined bead on the outside of the pipe, which bead will add to the strength of the weld, and will at the same time mark the place of welding, while the interior of the pipe will be smooth and unobstructed.

In place of a rectangular mold-clamp a loose wrapping of asbestus-cloth may be used, in which case, however, the external bead or projection will not be so well defined as in the case where a mold-clamp is used.

While I am not confined in my process to the use of any particular gas for producing the internal pressure in the pipes to be welded together, I use, by preference, oxygen, which will promote the heating of the pipe at the point of juncture, and thus facilitate the process.

This process may be practiced to a nicety, since the apparatus used will be provided with suitable current-regulators, whereby the heating of the pipe may be stopped, increased, or reduced at the will of the operator, while the internal gas-pressure can also be regulated at will.

Having now fully described my invention, I claim and desire to secure by Letters Patent—

1. The process of welding sections of metal pipe or other hollow metallic articles, consisting in heating their contiguous ends to a welding heat by the action of an electric current in the presence of a fluid-pressure within the said sections, substantially as described.

2. The process of welding together sections of metal pipe or other hollow articles, consisting in raising their contiguous ends to a welding heat by the passage through the same of a current of electricity, and then forcing the ends of the sections together and simultaneously therewith applying an internal fluid-pressure, substantially as described.

3. The process of welding together sections of metal pipe or other hollow metallic articles, consisting in subjecting their contiguous ends to the action of a heating-current of electricity until an initial fusion or weld hermetically closing the seam is produced, then applying an internal fluid-pressure at the said ends, and simultaneously therewith forcing the sections against each other, whereby the weld is finished and the formation of an internal burr is prevented, substantially as described.

4. The process of welding together sections of metal pipe or other hollow articles, consisting in first reducing the mass or thickness of the ends to be welded, then placing said ends in contact with each other, then subjecting them to the action of a heating-current of electricity until an initial weld hermetically sealing the seam is produced, and finally completing the weld while applying an internal fluid-pressure, substantially as described.

5. The process of welding together sections of metal pipe or other hollow metallic articles, consisting in subjecting the contiguous ends of the sections to the action of a welding current of electricity in the presence of an internal fluid-pressure, and circumscribing or limiting the protuberance of metal thus formed on the exterior of the seam, substantially as described.

6. The process of welding together sections of metal pipe or other hollow metallic articles, consisting in raising the ends of the sections to be joined to a welding heat by the passage of a current of electricity, then upsetting the joined ends by a longitudinal pressure, and simultaneously therewith forcing the upset metal to the exterior of the pipe by internal gas-pressure, substantially as described.

7. The process of welding together sections of metal pipe or other hollow metallic articles, consisting in subjecting their contiguous ends to the action of a welding current of electricity in the presence of a pressure of oxygen gas within the said sections, substantially as described.

In testimony whereof I have signed my name to this specification in the presence of two subscribing witnesses.

ELIAS E. RIES.

Witnesses:
E. H. PILSBURY,
L. A. WRAY.